(12) United States Patent
Desmond et al.

(10) Patent No.: US 7,118,256 B2
(45) Date of Patent: Oct. 10, 2006

(54) LIGHTING DEVICE INCORPORATING PLASMA LAMP FOR VEHICLES

(75) Inventors: Michael Desmond, Long Beach, CA (US); Richard Plavetich, Laguna Beach, CA (US)

(73) Assignee: Mitsubishi Jidosha Kogyo Kabushiki Kaisha, (JP)

( * ) Notice: Subject to any disclaimer, the term of this patent is extended or adjusted under 35 U.S.C. 154(b) by 207 days.

(21) Appl. No.: 10/805,483

(22) Filed: Mar. 22, 2004

(65) Prior Publication Data
US 2004/0246736 A1 Dec. 9, 2004

Related U.S. Application Data

(60) Provisional application No. 60/456,601, filed on Mar. 21, 2003.

(51) Int. Cl.
*B60Q 1/04* (2006.01)
*B60Q 3/00* (2006.01)

(52) U.S. Cl. ................. 362/491; 362/263; 362/505; 362/507; 362/464; 362/545

(58) Field of Classification Search ........... 362/491, 362/496, 505, 507, 545, 231, 263, 262, 464, 362/261, 811; 313/582, 583, 493, 637
See application file for complete search history.

(56) References Cited

U.S. PATENT DOCUMENTS

| 4,965,876 | A | * | 10/1990 | Foldi et al. ............. 362/247 |
| 5,089,745 | A | * | 2/1992 | Iannini ................... 315/76 |
| 5,618,102 | A | * | 4/1997 | Ferrell .................... 362/516 |
| 5,900,678 | A | * | 5/1999 | Rodgers ................. 307/10.1 |
| 5,949,180 | A | * | 9/1999 | Walker .................... 313/113 |
| 6,404,132 | B1 | * | 6/2002 | Krumholz ............... 315/82 |
| 2002/0163794 | A1 | * | 11/2002 | Hayami ................... 362/40 |
| 2003/0128545 | A1 | * | 7/2003 | Trappani et al. ......... 362/351 |

* cited by examiner

*Primary Examiner*—Stephen Husar
*Assistant Examiner*—Peggy A. Neils
(74) *Attorney, Agent, or Firm*—Rossi, Kimms & McDowell, LLP (57) ABSTRACT

A lighting device for a vehicle has at least two light sources, a primary light source for general illuminating or marking purposes and a secondary light source, namely a plasma lamp, for creating exciting and appealing lighting effects.

19 Claims, 9 Drawing Sheets

LIGHTING DEVICE INCORPORATING PLASMA LAMP FOR VEHICLES

CROSS-REFERENCE

This application claims priority to provisional application Ser. No. 60/456,601, filed Mar. 21, 2003, and incorporates the disclosure thereof in its entirety.

BACKGROUND

Plasma lamps can provide exoteric looking lighting effects. They also come in many shapes and forms, such as flat panel, globe-style, elongated, etc. Plasma lamps operate based on potential differences to create pleasurable looking electron streamers (natural lightening effect). Specifically, plasma lamps typically have a central electrode in an enclosure, which is at a lower potential than the electrode. The enclosure can be construed to be grounded or becomes grounded when touched. The enclosure is typically filled with gas containing charged particles, such as ions and electrons. When the central electrode is highly charged, an oscillating electromagnetic field moves the electrons to generate plasma, namely gas containing charges particles, such as electrons and ions, which result from electrons that are broken free from their parent atom or molecule. Electrons are negatively charged, whereas the ions are positively charged. As they move about the plasma, they change the local characteristics of the electromagnetic field. This combined with the oscillating electromagnetic field of the electrode excites ions, molecules, and atoms. When these particles become excited, they radiate energy in the form of a photon, or unit of light. The characteristics of an electromagnetic field determine the overall appearance of a plasma lamp. Changes to the electrode voltage or pressure within the lamp change the appearance of the streamers. The type of gas within the lamp can affect the color of light emitted.

While the effects produced by plasma lamps are well known, the lamps themselves have not been put to into useful product. The present invention proposes incorporating plasma lamps in automobiles to provide a lighting device. While newer automobiles incorporate colored or fluorescent lamps to create a new or modern appearance, nothing yet comes close to the unique appearance of plasma lighting. Accordingly, there is still a need to introduce even more creative and exciting appearances for exterior and interior automotive lamps. The present invention addresses this need.

SUMMARY OF THE INVENTION

The present invention relates to a lighting device for a vehicle, such as for a control button/knob, a head light assembly, a tail light assembly, a shifter knob, a shift indicator, instrument panel light, etc.

One aspect of the invention is a lighting device for a vehicle. The device has first and second light sources provided in a housing or enclosure. The second light source comprises a plasma lamp filled with gas containing charged particles. The housing includes a light transmitting member through which the light from the first and second light sources transmits.

The plasma lamp can provide streamers that can provide different lighting effects. The plasma lamp can be self contained unit or integrated into the housing. The plasma lamp also has at least a first electrode inside the enclosure for charging the particles. The plasma lamp can include a second electrode spaced from the first electrode. The first electrode is positioned substantially centrally of the second electrode so that the streamers from the plasma lamp bridge the spacing between the first electrode and the second electrode. The second electrode can be grounded.

According to one embodiment, the plasma lamp can have a central portion extending toward the light transmitting member and an outer portion surrounding the central portion. The first electrode can be positioned in the central portion and the second electrode can be coaxially positioned at an end of the outer portion positioned farther away from the light transmitting member so that the streamers travel through the central portion toward the light transmitting member and arc back to the end of the outer portion surrounding the central portion. The second electrode is groundable and can extend continuously or intermittently around the central portion. The plasma lamp can further include a third electrode formed on or embedded in the central portion, and positioned substantially collinear with the first electrode. Here, the second and third electrodes can be selectively grounded.

According to another embodiment, at least part of the housing, including the light transmitting member can form the enclosure of the plasma lamp, and the second electrode is composed of at least one of wires integrated into the light transmitting member or an electrically conductive coating on the light transmitting member so that the streamers travel from the first electrode to the light transmitting member.

A third electrode can be positioned closer to the light transmitting member so that the first and third electrodes can be selectively charged to produce streamers having different effects. The first electrode can be composed of a plurality of electrodes positioned at different locations. These electrodes can be independently chargeable to produce streamers having different effects.

According to another embodiment, the first and second embodiments described above can further include a reflector spaced from the first light source and facing toward the light transmitting member. The first light source is aimed toward the reflector so that the light from the first source is reflected toward the light transmitting member.

The first light source can provide a primary illumination, and can be at least one of LED, incandescent, and halogen form, or any conventional light bulb. In this regard, a plurality of LEDs can be positioned around (at any position that will not interfere with its operation) the central portion or the first electrode, or any place suitable. The lighting device can further include a third light source comprising a plurality of LEDs positioned around the central portion or the first electrode, or any place suitable.

According to another aspect of the invention, the lighting device has an enclosure located adjacent to the surface of a panel so that touching the enclosure changes electromagnetic field characteristics of the plasma lamp to alter the streamers in the plasma lamp. In this regard, the lighting device can be a shifter knob. Touching the knob changes electromagnetic field characteristics of the plasma lamp to alter the streamers in the plasma lamp.

Another aspect of the invention relates to the aforedescribed lighting device with a control unit and a sensor. Specifically, the lighting device has the first and second (plasma) light sources. The sensor detects an operation condition of the vehicle. The control unit controls the operation of the plasma lamp based on an output of the sensor. The control unit can charge the first electrode and grounds the second electrode when the sensor detects a predetermined operating condition of a vehicle, such a brake engagement.

The second electrode can be formed outside the enclosure, formed on the enclosure, or embedded in the enclosure. The control unit can charge the first electrode and ground the second electrode when the sensor does not detect the predetermined operating condition.

In one embodiment, a third electrode can be formed on the enclosure or embedded in the enclosure, and the control unit can charge the first electrode and ground the third electrode when the sensor detects the predetermined operating condition to generate more focused streamers, and can ground the second electrode when the sensor does not detect the operating condition to disperse the streamers.

In another embodiment, the third electrode can be spaced from the first electrode, and formed inside the enclosure. Here, the control unit can charge the third electrode and ground the second electrode when the sensor detects a predetermined operating condition of a vehicle to generate more focused streamers, and can charge the first electrode when the sensor does not detect the operating condition to disperse the streamers.

Additional electrodes can be disposed at different locations along the enclosure. The control unit can charge a selected sequence of additional electrodes and grounds the second electrode based on the sensor detecting a predetermined condition of a vehicle, such as a speed of the vehicle.

DESCRIPTION

The present lighting device uses at least two light sources, a primary light source for general illuminating purposes, such as a back light, and a secondary light source, namely a plasma lamp, for creating exciting and appealing lighting effects. Plasma lamps generally have a central electrode encased in an enclosure, which is filled with gas containing charged particles. Such a lamp can provide an ever-changing array of streamers, namely lit arcs (akin to natural lightening), bridging the spacing between the central electrode and the enclosure, which can be a lamp housing. In an automotive application, these charged streamers can be configured to function as exterior running lamps, made to react to indicate driver signals, and highlight various interior controls and displays.

Plasma lamps with streamers can be configured to serve as marking lamps on the exteriors of vehicles, such as illustrated in FIGS. 1 and 6–9. This can include tail/brake lights, side markers, parking lamps, turn signal lamps, and head lights. Additional functions can be built into the lighting device according to the present invention. By changing the electra-magnetic characteristics of the lamp assembly, the streamers can be made to focus on specific areas of the lamp surface, creating 'hot spots' or areas of higher intensity lighting (see FIGS. 7 and 9). Such a lighting can serve the function of a turn indicator or brake lamp, and can be activated intermittently at will. For example, a focused plasma lamp can be made by supplying electrical power to metallic coatings on the selected surface area of the lamp, switching on and off as desired. Alternatively, magnets or electromagnets can be used to influence light patterns. Supplemental conventional lightings located within or adjacent to the plasma lamp can also serve this purpose or further enhance it.

Other exterior surfaces can serve as lamp assemblies as well to add a unique appearance to a given exterior form. For example, a rear spoiler can contain an integral plasma lamp, causing an ever-changing glow from within the spoiler housing with the oscillating streamers. See FIG. 1. Such a lamp can be activated to signal or warn other drivers of danger or provide a way of communicating with the other drivers. For instance, the streaming pattern can be controlled to display an SOS or help signal or the like. More specifically, the spoiler can have different lighting areas allocated to light display messages protocols. By controlling the light pattern, different messages can be displayed.

Figure 1:
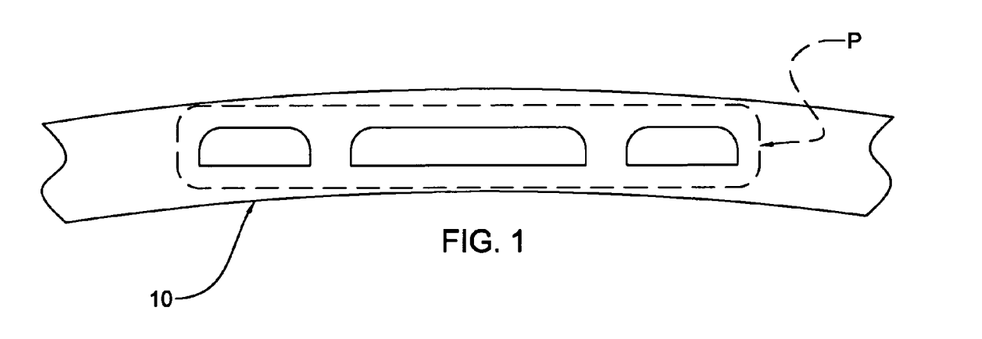
FIG. 1 schematically illustrates one embodiment of a lighting device, namely for a vehicle spoiler, that incorporates a plasma lamp.

FIG. 1 schematically illustrates a rear spoiler having a lighting device 10 according to the present invention. Here, the lighting device can include at least one plasma lamp P (the outline thereof shown in phantom) and a primary light source, such as LEDs and incandescent bulbs. If a single plasma lamp is used, as illustrated in FIG. 1, portions of the housing can be masked or covered with an opaque material, such as plastic, to expose only the desired regions of the lamp housing. In the illustrated embodiment, three exposed housing regions S1, S2, S3 are provided, which can serve as, for example, a left turn signal, a brake indicator, and a right turn signal, respectively. That is, by changing the electra-magnetic characteristics of the lamp assembly, the streamers can be forced to focus on any of the regions S1, S2, S3, namely by selectively grounding the desired exposed portion (lens) of the housing. Similarly, a plasma lamp can be adopted to each of the side mirrors to achieve a similar effect.

Figure 2:
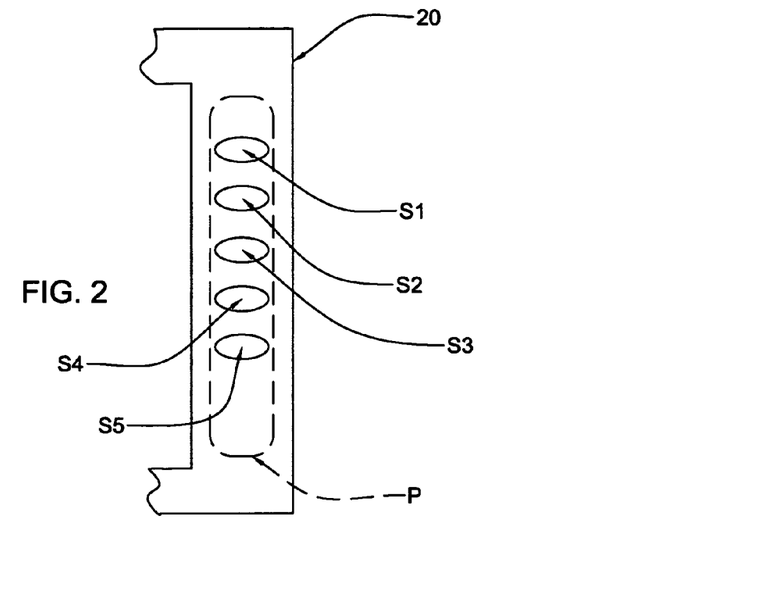
FIG. 2 schematically illustrates another embodiment of a lighting device, namely a control indicator, such as a shift indicator, that incorporates a plasma lamp.

A lighting device incorporating a plasma lamp also can be used as a control indicator. For example, the embodiment of FIG. 2 schematically illustrates an indicator 20 for a transmission shifter. Here, either a discrete number of lighting devices, one for each indicator S1, S2, S3, S4, S5, or a single lighting device can be used instead, similar to the embodiment of FIG. 1. The transmission shifter can have a triggering device, such as a switch, that can identify the position of the shifter to illuminate corresponding shift position, such as PARK, REVERSE, DRIVE, etc. A controller then can control the pattern of streamer to light corresponding indicator based on the position of the shifter. Again, this can be achieved by selectively grounding the indicator associated with the shifter position. Here, a single plasma lamp can be used to focus on different displays or indicia, similarly as indicated above by controlling the lamp's electra-magnetic characteristics, such as with magnetic field or electrical field, i.e., by namely controlling the grounding of the indicators. For instance, if the indicator S1 is selectively grounded, while the other indicators are not, then the streamers will be directed primarily to the indicator S1.

Figure 3:
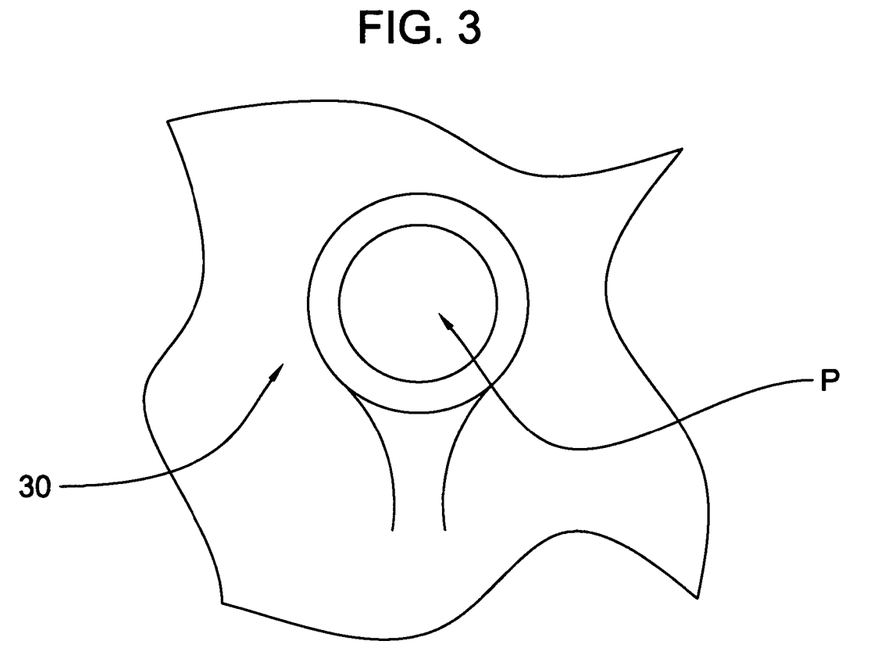
FIG. 3 schematically illustrates another embodiment of a lighting device, namely a control indicator for a vehicle, that incorporates a plasma lamp.

FIG. 3 illustrates another embodiment of a lighting device 30 according to the present invention. Here, the lighting device can be a control panel or switch, which can be used as an interior lighting to accent the interior design, or serve to add interesting interaction with interior controls, such as an electric motor power adjustment, i.e., fan speed indicator. Accent lighting can be added with panels of any shape lit by arching plasma lamps built within the panels. These panels can serve to provide direct or indirect illumination, or highlight any interior surface features. Controls can be contained within a plasma light backlit panel to help indicate when a control has been selected. For example, a transparent electric membrane containing a control switch can be placed over a plasma lit panel. The switch can be used to activate, for example, the HVAC or audio controls typically found in the center of the dashboard or instrument panel. When the operator or passenger touches the switch, the streamers from the plasma lamp positioned therebehind can concentrate to the switch location, attracted by the electromagnetic characteristics of the human body (grounding effect), thus dramatically indicating that a switch had been activated.

Moreover, individual controls also can be essentially comprised of small plasma lamps without using a back light (primary light source). For example, interior knobs can be made of a plasma lamp, causing visual sparks with fingers upon grasping, providing a dramatic and very appealing visual interface. The region to be illuminated can be further enhanced by placing fluorescent coating or even organic materials that glow when charged. Various colored plasma lamps can be used to signal drivers, such as electrical failures, fan speed, engine speed, coolant temperature, etc.

Figure 4:
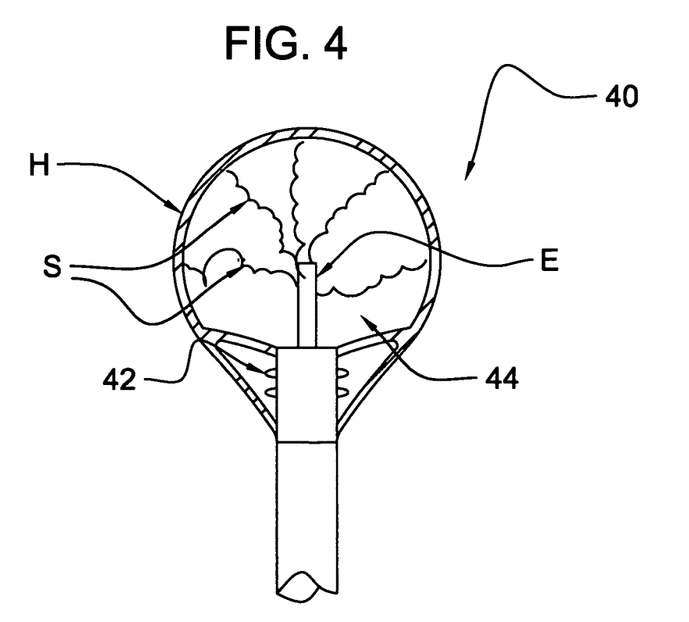
FIG. 4 schematically illustrates a cross section of another embodiment of a lighting device, namely a shifter knob, that incorporates a plasma lamp.

Referring to FIG. 4, a lighting device 40 according to the present invention can comprise a shifter knob incorporating a plasma lamp to illuminate various arrays of streamers when touched by the driver. Here, the lighting device 40 has a primary light source 42, such as LEDs, which can used as a back light, and a plasma lamp 44, which has a central electrode E and an enclosure comprised of a housing H or the outer member of the shifter knob. The housing H can be made transparent or translucent. When the operator touches the housing, the lamps' electra-magnetic characteristics change due to the grounding effect, causing the streamers S to behave differently. The primary light source 42 can be placed in a separate compartment away from the gas filled enclosure, as illustrated in FIG. 4, or can be placed in the gas filled enclosure, namely within the plasma lamp.

Figure 5A:
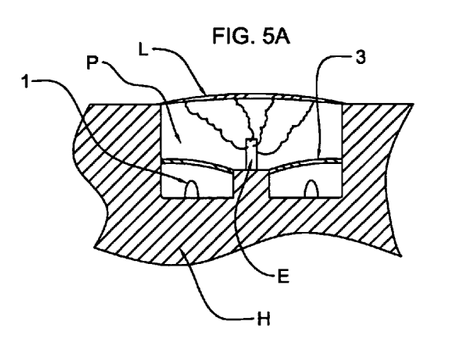
FIGS. 5A–5D schematically illustrate the detailed construction of the lighting device of FIGS. 1–4.

FIGS. 5A–5D provide a detailed construction of the lighting device according to the present invention. Each of the lighting devices illustrated in FIGS. 1–4 can be constructed as follows. FIG. 5A schematically illustrates a typical cross section of a lighting device according to the present invention. The lighting device has a housing H, which can be formed of any non conductive or insulating material, that holds at least two different types of light sources, one of them being a plasma lamp P, and the other being a primary light source 1, such as a back light. The housing can include a light transmitting member (such as a transparent or translucent lens) L through which light can transmit or partially transmit. Alternatively, part of the housing itself can be transparent or translucent, such as the shifter knob of FIG. 4. The housing H itself, with the lens L, and a partition member 3, can form an enclosure of the plasma lamp, sealing in the gas with charged particles, as illustrated in FIG. 5A. The partition member itself can be integrally formed with the housing or separately attached sealingly to the inner walls of the housing to create a hermetic seal. The partition member also can be transparent or translucent so that light can transmit. The plasma lamp includes at least one electrode E. When the electrode is powered, the particles in the gas create streamers that appear to randomly jump from the electrode to the enclosure, namely the lens, which is at a lower potential. The lens can be grounded. When the operator touches the enclosure, the potential difference or the electro-magnetic characteristics of the human body attract the light streamers, creating different streaming effect. The operation of the plasma lamp is well known.

Figure 5B:
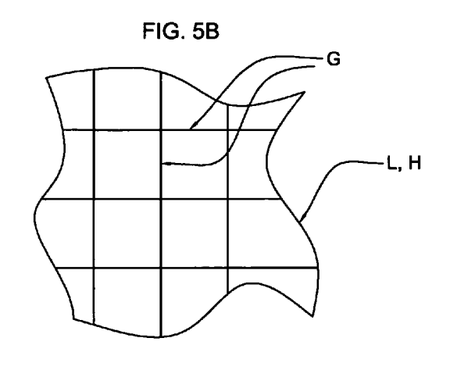
Figure 5C:
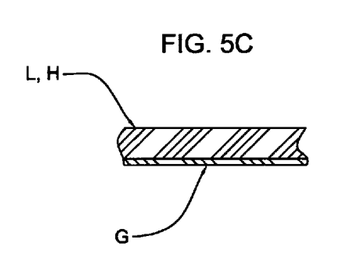
Figure 5D:
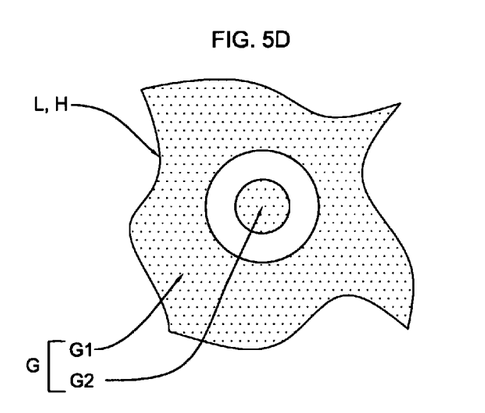

While the enclosure, in particular, the lens or transparent portion need not be specifically grounded, grounding the same will cause the streamers to behave differently. By grounding at a specified area or areas, the pattern of streamers can be controlled or focused to the area(s) being grounded. In this regard, the transparent or translucent portion of the enclosure, i.e., housing or lens portion, can include a wiring or wiring pattern W imbedded therein as illustrated in FIG. 5B or can be coated with a transparent electrically conductive film as illustrated in FIGS. 5C and 5D. FIG. 5D shows electrically conductive coatings or electrodes (G1, G2) placed selectively at different locations. The grounded area is highlighted with dots merely for illustrating purposes. By controlling the areas that are grounded, the streamers can be focused to a particular area on the enclosure, housing, or lens.

Figure 6:
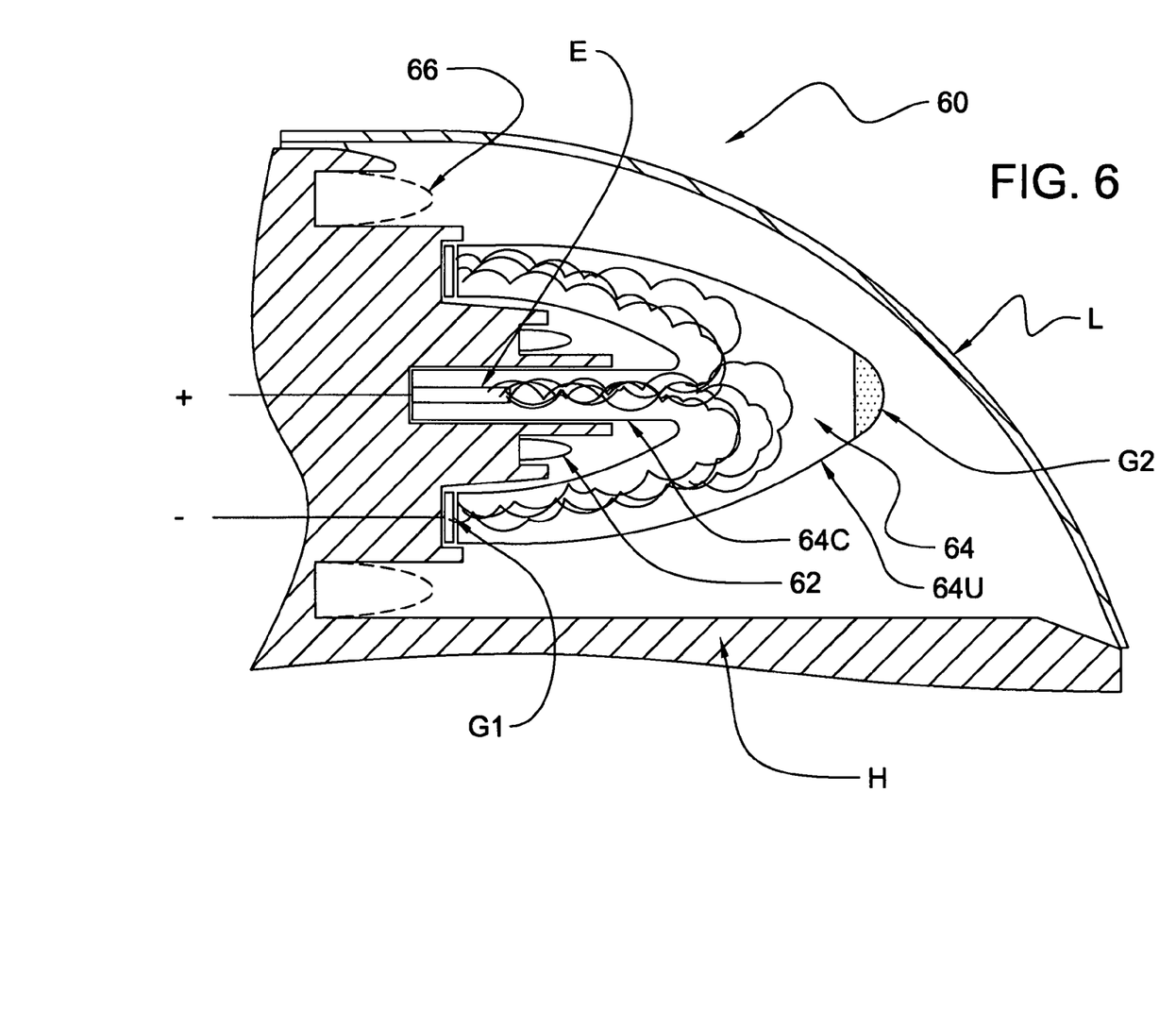
FIG. 6 schematically illustrates another embodiment of a lighting device, namely a vehicle head light.

FIGS. 6–9 illustrate additional embodiments of lighting devices 60, 60', 70, 70' according to the present invention. Referring to FIG. 6, which can be a head light assembly, the lighting device 60 includes a housing H containing a primary light source 62 and a plasma lamp 64. The plasma lamp includes at least one positive electrode E and at least one negative electrode G1, G2 (G). The primary light source 62 can include at least one lamp (FIG. 6 is illustrated with a plurality of LEDs positioned evenly around a neck of the plasma lamp), which can be have combined high/low modes for general illuminating purposes, such as back lighting. A third light source 66 having different lighting intensity or the same as the primary light source also can be included for illuminating or marking purposes. In this embodiment, the role of the first and third light sources can be swapped or alternated. For instance, one of the first and third light source can be a back light and the other can be a turn signal.

Figure 7:
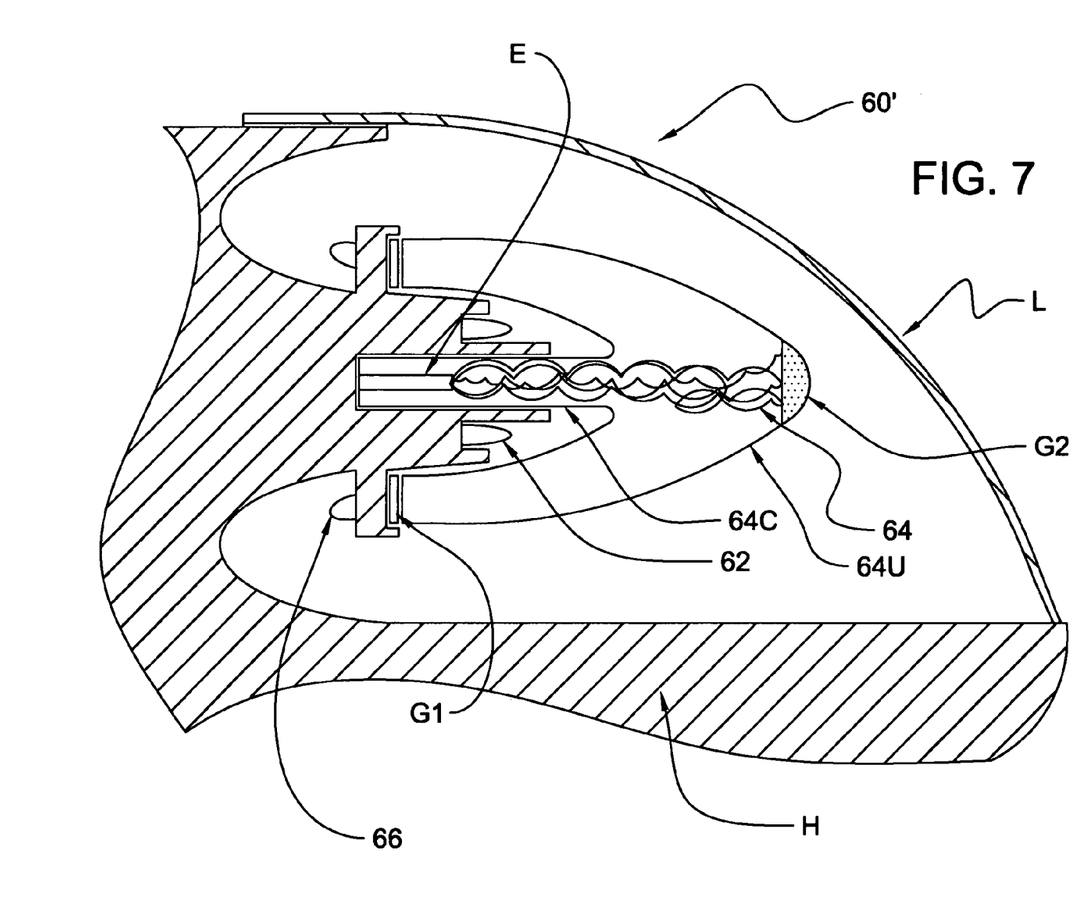
FIG. 7 schematically illustrates another embodiment similar to FIG. 6.

The plasma lamp has a globe formed by a central portion 64C that extends toward the lens L and an outer portion 64U that is spaced from and surrounds or shrouds the central portion. The plasma lamp thus has an arrow- or mushroom- or umbrella-shaped profile. The electrode E is positioned in the central portion and extends toward the lens. The negative electrode G1 can be coaxially positioned at an end of the outer portion that is positioned farther away from the lens so that the streamers travel through the central portion toward the lens and arc back to the end of the outer portion surrounding the central portion. Another negative electrode G2 can be positioned at the front of the plasma globe. By grounding the electrode G2 instead of G1, the streamers can be concentrated onto the front portion of the globe for a different streaming effect, such as illustrated in FIG. 7. The electrode (conductive portion) G2 can be a clear type coated on the front portion of the globe or can be a wiring embedded therein, as disclosed earlier. The electrode G2 can be wired through the housing H or the lens L. For example, although not illustrated, a thin conductive probe can extend downwardly from the electrode G2 and extend through the housing to a conductor.

Figure 10A:
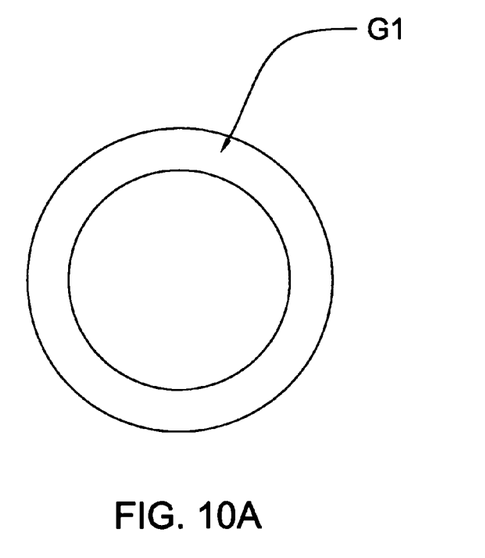
FIGS. 10A–10D schematically illustrate the alternative embodiments of the lighting device of FIGS. 6–9.
Figure 10B:
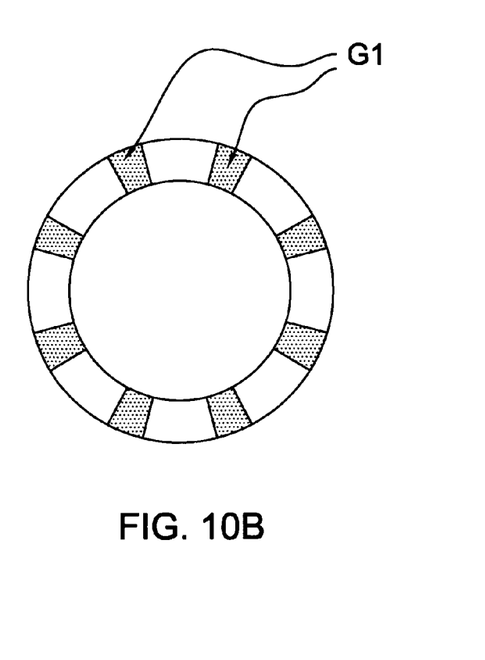

Referring to FIGS. 10A and 10B, the electrode G1 for the embodiment of FIG. 6 can be annular and continuously conductive 360 degrees around the central portion (FIG. 10A) so that the streamers are substantially evenly distributed around the central portion. Alternatively, as illustrated in FIG. 10B, the electrode can be intermittently conductive (dotted area for illustrative purposes only) around the central portion to form a plurality of electrodes, which can be independently grounded. Specifically, the embodiment of FIG. 10B can be made of a non-conductive member having an annular shape, with conductive portions or electrodes G1 placed selectively around the ring. Each of the conductive portions can have its own grounding leads for independent control thereof, or a single grounding lead can ground all of the conductive portions G1. By independently controlling a portion or portions to be grounded, the streamers can be manipulated for different lighting effects. Thus, by providing a ground configuration as illustrated in FIG. 10B, many different effects can be achieved.

FIG. 7 is similar to the embodiment of FIG. 6. Here, the lighting device 60' has a third light source 66 aimed (rearward) away from the lens L to a reflector R, which reflects light back toward the lens or front of the vehicle. The third light source 66 can be operated as either a back light or a turn signal. The primary light source 62 can function as explained in the embodiment of FIG. 6, or can even be omitted if desired. The reflector can be a coating or mirror or any conventional type used to maximize reflection of light.

While the embodiments of FIGS. 6 and 7 are described as a head light assembly, it can be used as a tail light assembly, with different primary and tertiary lighting arrangements, namely different lighting intensity and color. Moreover, the head light assembly in the embodiment of FIGS. 6 and 7 can incorporate the plasma lamp configuration illustrated in FIGS. 8 and 9, and vice-versa.

Figure 8:
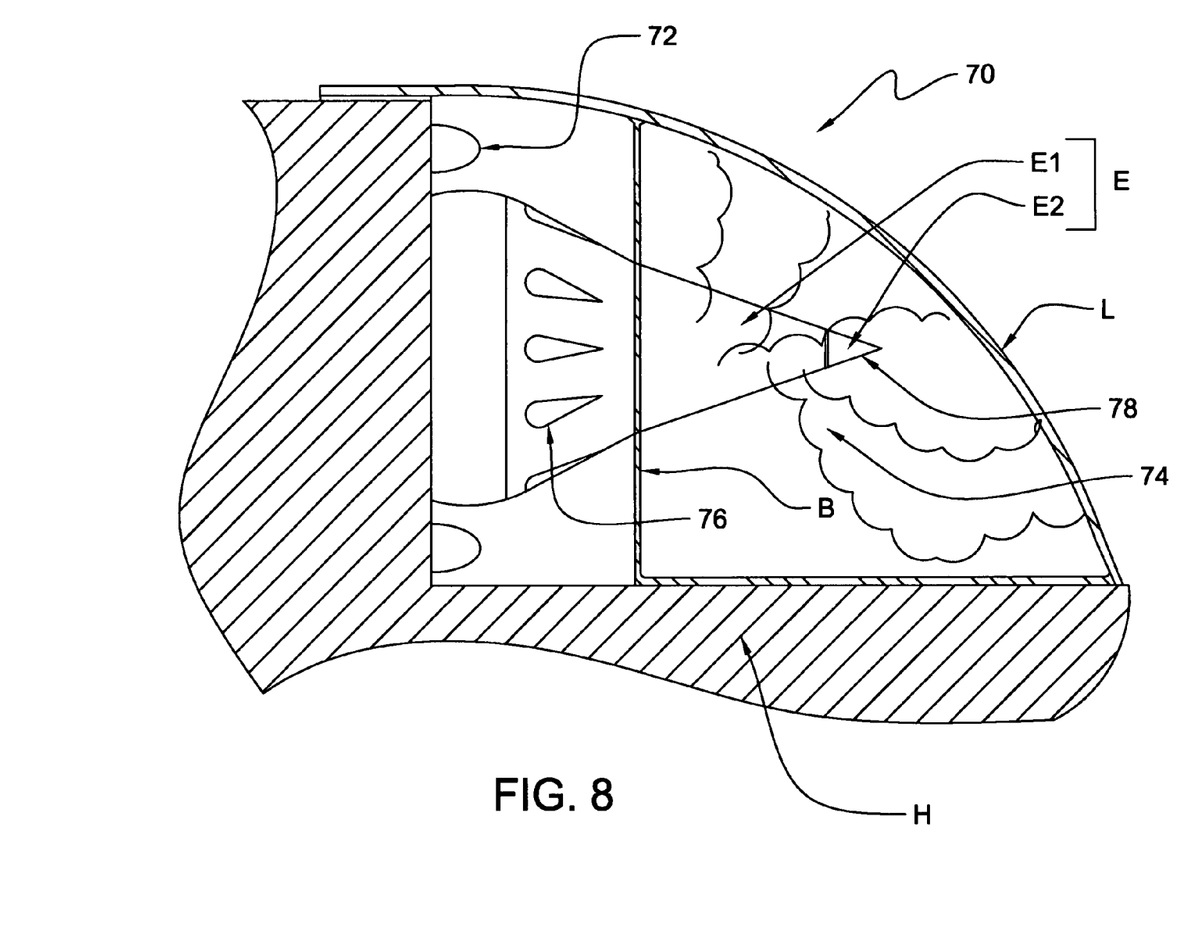
FIG. 8 schematically illustrates another embodiment of a lighting device, namely a vehicle tail light.

Referring to FIG. 8, the lighting device 70, which can be a tail light assembly, includes a housing H and a primary light source 72, 76, having at least one light, i.e., bulb, LED, or any suitable light generating means, for lighting the rear of the vehicle and a plasma lamp 74 for creating unique lighting effects. The lighting device 70 can further include a tertiary light source 76, 72, which can function as a braking or reversing indicator. The tertiary light source can include at least one light, such as an LED or bulb. In the illustrated embodiment, a plurality of lights are distributed around circularly relative to the electrode E. Similarly, the primary (or tertiary) light source can include a plurality of lights distributed concentrically around the tertiary (or primary) light source. The primary light source can have a dual intensity lights so that a high intensity mode can act as a braking indicator and a low intensity as a back/running light. The tertiary light source can be a reverse indicator, or a turn signal. Different lighting activities can be assigned to different light sources as desired to form different lighting combinations.

Figure 9:
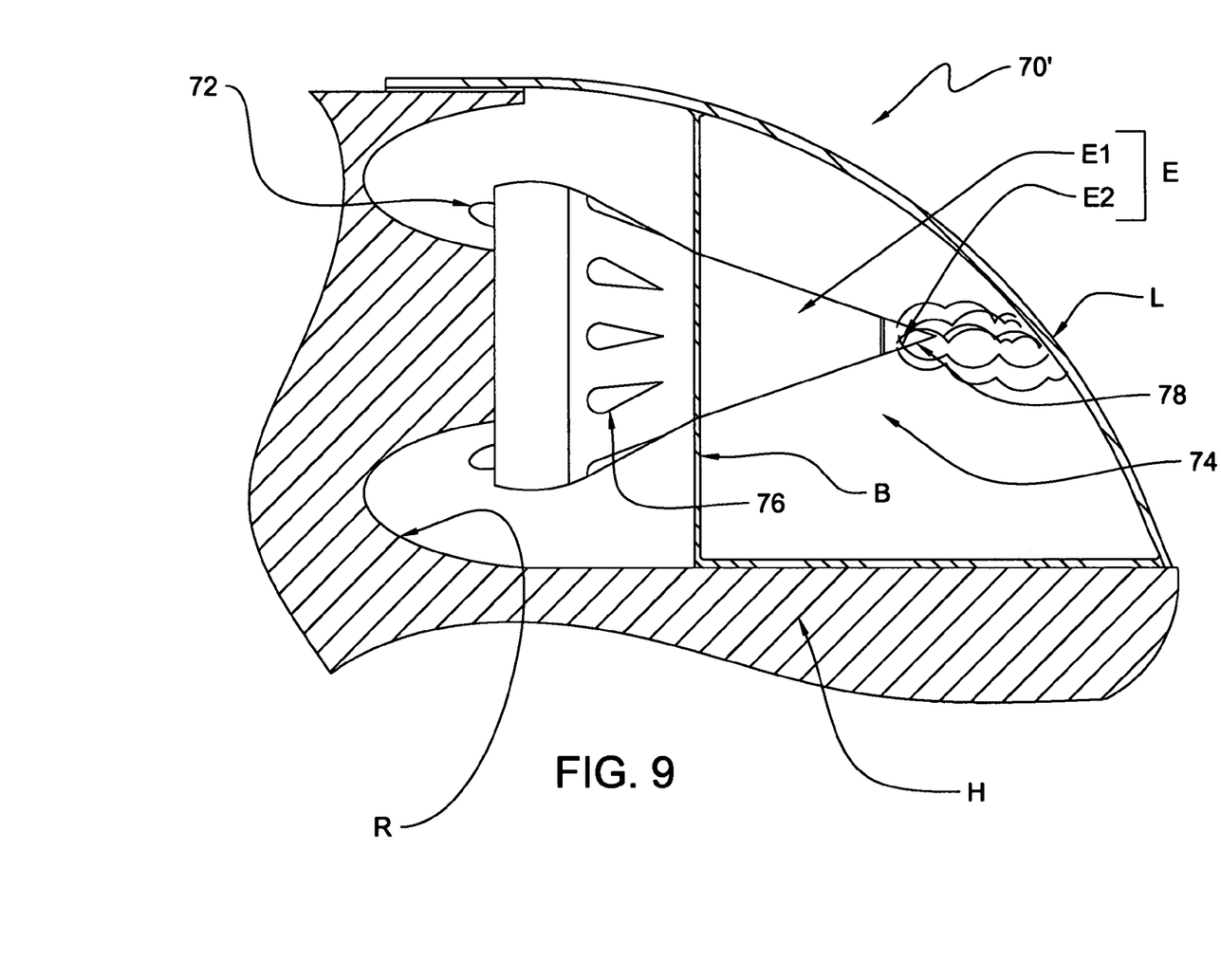
FIG. 9 schematically illustrates another embodiment similar to FIG. 8.

The plasma lamp 74 includes at least one electrode E and at least one ground G coated on or embedded in the lens L (see FIGS. 5B–5D). Here, the electrode E is positioned at a tip end 78 (which is illustrated as a conical figure, but can have any other shape) of the tertiary light source. That is, the electrode extends toward the lens, and is positioned between the tertiary light source and can be centrally or concentrically positioned therewith. The entire area of the tip end or a portion or portions thereof can be made conductive. In the illustrated embodiment, the tip can have two separate electrodes E1, E2, which can be activated independently as desired to create different light effects. For example, as illustrated in FIG. 8, only the electrode E1 is charged. Since the area thereof is much greater than the electrode E2, the charge will not be as concentrated, and since it is positioned further away from the lens (grounded area), the streamers will be dispersed more. FIG. 9 illustrates the plasma lamp with the electrode E2 charged. Since the charge is concentrated to a smaller area and the electrode is closer to the grounded area, the streamers will be more focused into a smaller area. Moreover, as previously explained, the ground can be selectively activated only on a portion of the lens to create streamers that are more concentrated.

Figure 10C:
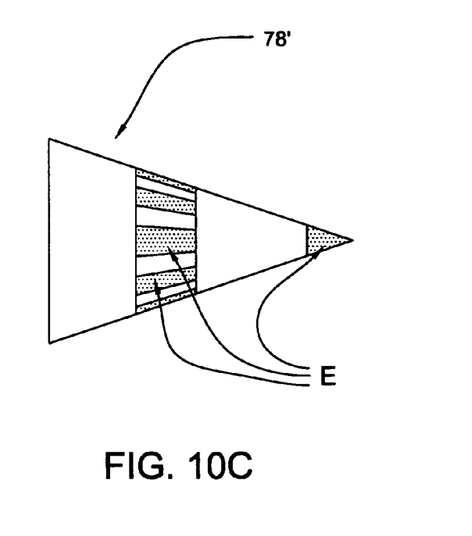
Figure 10D:
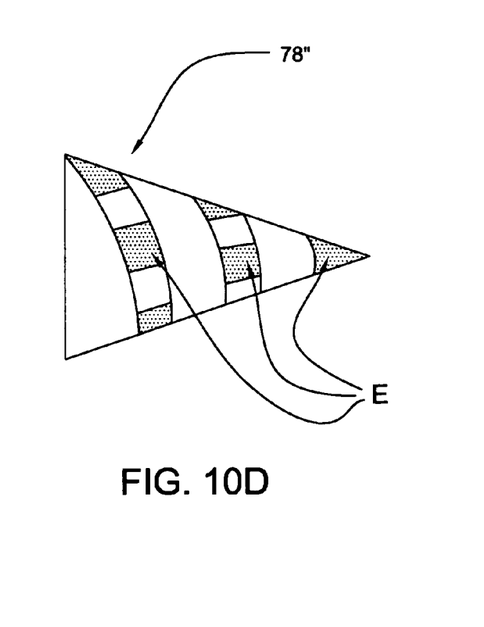

Referring to FIGS. 10C and 10D, the tip end 78', 78" can be made non-conductive. Conductive portions, which form the electrodes, can be embedded or formed therein selectively. In the embodiment of FIG. 10C, the conductive portion (highlighted with dots for illustrative purposes only) are alternatively positioned therearound along a periphery and at the pointed end. In the embodiment of FIG. 10D, the conductive portions, which form the electrodes, are positioned along a spiral. Although FIG. 10D is illustrated with a plurality of alternating conductive portions (again highlighted with dots for illustrative purposes), the spiraling area can be entirely conductive. When a plurality of electrodes are spaced as configured in FIGS. 10C and 10D, they can be selectively and independently activated to produce a unique streaming effect. For instance, referring to FIGS. 11A and 11B, a control unit and at least one sensor can be used for detecting the speed of the vehicle. Depending on the vehicle speed, the control unit can control the electrode and the ground activating sequence to produce streamers having a swirling or rotating effect that is dependent on the vehicle speed. That is, the faster the vehicle travels, the faster the swirling effect, and vice-versa. Alternatively, a single electrode having a particular pattern can affect the streamers. Thus, the grounding can be controlled to create different effects based on the sensor input. By controlling the grounding and charging of the electrodes, as illustrated in FIGS. 10C and 10D, many different streaming effects can be achieved.

FIG. 9 is similar to the embodiment of FIG. 8. Here, similar to the embodiment of FIG. 7, the lighting device 70' has its primary or third light source 72 aimed away from the lens L to a reflector R, which reflects light back toward the lens or rear of the vehicle. The primary or third light source 72 can be operated as a running/back light or reverse light or turn signal. The other 76 of the primary and third light sources can function as explained in the embodiment of FIG. 8. Again, the reflector can be a coating or mirror or any conventional type used to maximize reflection of light.

In the embodiments of FIGS. 8 and 9, the lens L can be configured as disclosed in FIGS. 5B–5D, where the ground can be embedded into the lens or coated on the lens. Selected portion of the lens can be grounded independently from other areas so that an intense concentration of streamers can be focused onto a small area to provide enhanced effect, for instance during braking. Moreover, in the embodiments of FIGS. 8 and 9, although the housing, including the lens L, can operate as an enclosure to seal in the operating gas for the plasma lamp, it can be more expedient to provide a separate enclosure that holds the gas. Here, a partition or barrier B made of transparent material can seal in the gas. In this regard, the electrode E, the barrier B, and the lens can be preassembled as a separate unit that can be attached to the secondary/tertiary light source.

Tables 1 and 2 disclose three distinctive streaming modes of operation of the tail light and the head light. Specifically, in the first mode (1), the streamers move erratically or randomly to provide unique appearance. This is achieved by charging and grounding the two electrodes (if more than one negative electrodes, grounding them all or selectively). In the second mode (2), which applies to the tail light assembly, the streamers are focused by charging the electrode E2 (or grounding electrode G2) positioned at the tip end closest to the lens to create more concentrated streamers, which can improve the visibility during braking (detected with a brake sensor). The second mode can also be applied to the head light assembly by activating the ground G2 only so that more concentrated streamers are focused to a smaller area. In the third mode (3), the streamers are manipulated to move in a predefined pattern, such as rotational or spiral (FIGS. 10C, 10D). As previously explained, this can be achieved with a plurality of electrodes located in the plasma lamp and charging/grounding the electrodes in a desired sequence so that the streamers move at a desired pattern. For instance, the electrodes can be switched corresponding to the vehicle speed. The electrodes can be positioned concentrically, helically, or spaced at a desired interval along the circumference of the plasma lamp.

TABLE 1

HEAD LIGHT ASSEMBLY

| Status | | | Primary Light | Plasma Streamers (Embodiments) | | |
|---|---|---|---|---|---|---|
| | | | | First | Second | Third |
| Running Light | ON | | OFF | ON(1) | ON(1) | ON(3) |
| Head Light | OFF | | OFF | OFF | OFF | OFF |
| | ON | Low | ON | ON(1) | ON(1) | ON(3) |
| | | High | ON | ON(1) | ON(1) | ON(3) |

TABLE 2

TAIL LIGHT ASSEMBLY

| Status | | | Primary Light | Plasma Streamers (Embodiments) | | |
|---|---|---|---|---|---|---|
| | | | | First | Second | Third |
| Tail Light | OFF | Brake OFF | OFF | OFF | OFF | OFF |
| | | Brake ON | ON (High) | ON(1) | ON(2) | ON(2) |
| | ON | Brake OFF | ON (Low) | ON(1) | ON(1) | ON(3) |
| | | Brake ON | ON (High) | ON(1) | ON(2) | ON(2) |

Figure 11A:
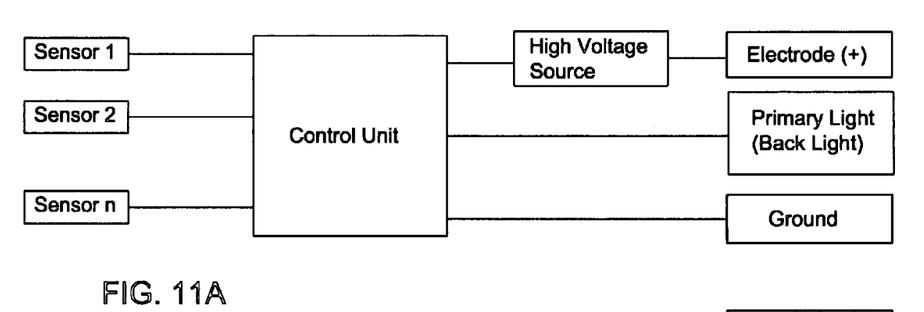
FIGS. 11A and 11B schematically illustrate a controller for creating different streaming effects for a head light and a tail light.
Figure 11B:
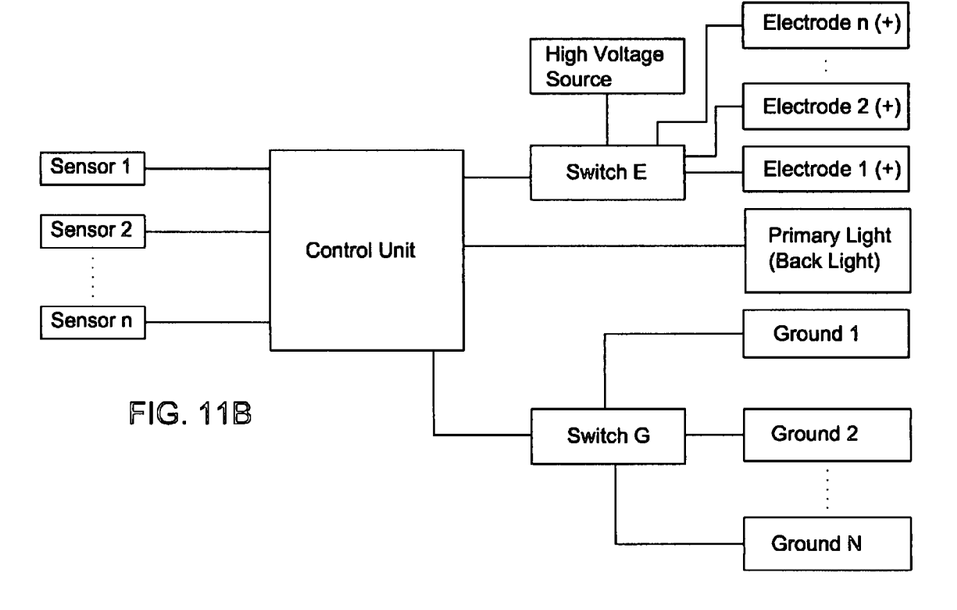

Referring to FIGS. 11A and 11B, the streaming modes can be controlled with a control unit, such as a CPU or dedicated control circuit, etc., based on the conditions detected by at least one sensor. These figures illustrate a plurality of sensors for detecting different vehicle conditions and streaming the plasma light accordingly. The control unit controls the activation of a high voltage source, which is applied to the electrode(s), the primary light, the plasma ground, and the grounding of the electrode. Referring to Tables 1 and 2 above, in the first embodiment, the control unit of FIG. 11A can be used to control the charging and grounding of the electrodes. For activating streamers during braking, a brake sensor can be input to the control unit, which can activate the electrodes during braking. For the second and third embodiments, the control unit illustrated in FIGS. 11B can be used to selectively charge or ground the electrodes, namely by selectively switching them, such as charging the second electrode E2 (FIGS. 8 and 9) upon the brake sensor detecting the brake application, and charging the electrodes (FIGS. 10C, 10D) in a desired sequence based on the detection of the vehicle speed with a speed sensor (and the brake sensor (when no braking is detected)).

Although the present invention is described as a lighting device for a vehicle, the same or similar application can be used anywhere, such as in homes, offices, etc. The term vehicle applies to all forms of transportation, including cars, trains, air planes, boats, etc.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention.

What is claimed is:

1. A lighting device for a vehicle, comprising:
a housing; and
first and second light sources provided in the housing,
wherein the second light source comprises a plasma lamp filled with gas containing charged particles,
wherein the plasma lamp comprises first and second electrodes, and
wherein the second electrode is substantially annular and spaced from the first electrode, and the first electrode is positioned substantially centrally of the second electrode so that streamers from the plasma lamp bridge the spacing between the first electrode and the second electrode.

2. The lighting device according to claim 1, wherein the lighting device is one of a head light assembly, a tail light assembly, a shifter knob, a shift indicator, or a control light for a vehicle.

3. The lighting device according to claim 1, wherein the plasma lamp comprises an enclosure, and at least the first electrode is in the enclosure.

4. The lighting device according to claim 1, wherein the first light source providing a primary illumination and the second light source providing the streamers for different light effect.

5. A lighting device for a vehicle, comprising:
a housing; and
first and second light sources provided in the housing,
wherein the second light source comprises a plasma lamp filled with gas containing charged particles,
wherein the housing includes a light transmitting member through which the light from the first and second light sources transmits,
wherein the plasma lamp comprises first and second electrodes positioned in the housing,
wherein the plasma lamp has a central portion extending toward the light transmitting member and an outer portion surrounding the central portion, and
wherein the first electrode is positioned in the central portion and the second electrode is coaxially positioned at an end of the outer portion positioned farther away from the light transmitting member so that the streamers travel through the central portion toward the light transmitting member and arc back to the end of the outer portion surrounding the central portion.

6. The lighting device according to claim 5, wherein the first light source comprises a plurality of LEDs positioned around the central portion.

7. The lighting device according to claim 5, further including a reflector spaced from the first light source and facing toward the light transmitting member, wherein the first light source is aimed toward the reflector so that the light from the first source is reflected toward the light transmitting member.

8. A lighting device for a vehicle, comprising;
a housing; and
first and second light sources provided in the housing,
wherein the second light source comprises a plasma lamp filled with gas containing charged particles,
wherein the housing includes a light transmitting member through which the light from the first and second light sources transmits,
wherein the plasma lamp comprises first and second electrodes,
wherein the second electrode is composed of at least one of wires integrated into the light transmitting member or an electrically conductive coating on the light transmitting member so that the streamers travel from the first electrode to the light transmitting member.

9. The lighting device according to claim 8, wherein the first light source comprises a plurality of LEDs positioned around the first electrode.

10. The lighting device according to claim 8, wherein the light transmitting member is located adjacent to the surface of a panel so that touching the the light transmitting member changes electro-magnetic field characteristics of the plasma lamp to alter streamers in the plasma lamp.

11. The lighting device according to claim 10, wherein the lighting device is a shifter knob, and the light transmitting member is located adjacent to the surface of the knob so that touching the knob changes electro-magnetic field characteristics of the plasma lamp to alter streamers in the plasma lamp.

12. A lighting device for a vehicle, comprising:
a housing;
first and second light sources provided in the housing, wherein the second light source comprises a plasma lamp comprising a first electrode, a second electrode spaced from the first electrode, and gas containing charged particles;
a sensor for detecting a predetermined condition; and
a control unit for controlling lighting effect of the plasma lamp based on an output of the sensor,
wherein the control unit in one mode charges the first electrode to disperse the streamers and in another mode charges the first electrode and grounds the second electrode to generate more focused streamers.

13. The lighting device according to claim 12, wherein the control unit charges the first electrode and grounds the second electrode when the sensor detects the predetermined condition.

14. The lighting device according to claim 12, wherein the plasma lamp includes an enclosure and the second electrode is formed outside the enclosure, formed on the enclosure, or embedded in the enclosure.

15. The lighting device according to claim 12, wherein the control unit charges the first electrode and grounds the second electrode when the sensor does not detect the predetermined operating condition.

16. The lighting device according to claim 12, wherein the plasma lamp includes an enclosure and a third electrode formed on the enclosure or embedded in the enclosure, and the control unit in yet another mode charges the first electrode and grounds the third electrode to generate more focused streamers.

17. The lighting device according to claim 16, wherein the predetermined operating condition is a brake engagement.

18. The lighting device according to claim 12, further including a third electrode spaced from the first electrode, the control unit in yet another mode charges the third electrode and grounds the second electrode to generate more focused streamers.

19. The lighting device according to claim 12, wherein the plasma lamp has additional electrodes disposed at different locations along the enclosure, and the control unit charges a selected sequence of additional electrodes and grounds the second electrode based on the sensor detecting a predetermined condition of a vehicle.

* * * * *